Nov. 10, 1964     A. BONFIGLIO     3,156,795
SHORTING MEANS FOR IGNITION SYSTEMS
Filed May 28, 1962     2 Sheets-Sheet 1

INVENTOR.
ANTHONY BONFIGLIO
BY

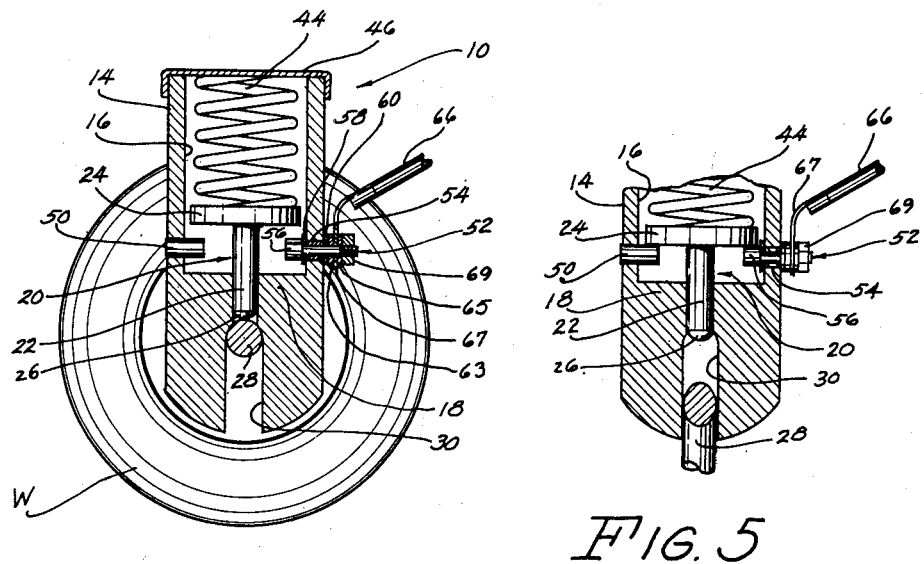

United States Patent Office 3,156,795
Patented Nov. 10, 1964

3,156,795
SHORTING MEANS FOR IGNITION SYSTEMS
Anthony Bonfiglio, 1600 W. 6th St., Racine, Wis.
Filed May 28, 1962, Ser. No. 198,294
2 Claims. (Cl. 200—61.52)

This invention relates to ignition "shorting" devices, and especially to a means of stopping the engine of a rotary-type mower or similar machine when the latter may assume a position that could endanger the person operating it.

Many persons have been injured, some fatally, by the revolving blades of rotary mowers. Occasionally a person may be injured when the mower tilts and a leg or foot is permitted to come into contact with the revolving blades. Still other injuries may occur when the operator places the machine on its side in order to make some adjustment, at which time a slight rotation of the blade by hand may start the engine causing serious injury to the operator. These injuries can be effectively prevented by the use of a mower having the present invention.

An object therefore of this invention is to generally improve ignition "shorting" devices.

Another object is to provide an ignition-system "shorting" device that will stop a mower engine whenever the mower tilts and the supporting wheel lifts out of contact with the ground.

Another object is to provide an ignition-system "shorting" device that prevents the mower engine from accidentally starting when the mower has been tilted on its side for the purpose of adjusting or servicing it.

Further objects and advantages of the invention will become apparent from a consideration of the following detailed description taken in connection with the accompanying drawings wherein an embodiment of the invention is shown. It is to be understood, however, that the invention is not limited to the details disclosed but includes all such variations and modifications as fall within the spirit of the invention.

Referring to the drawings:

FIG. 3 is an enlarged elevational sectional view taken at 3—3 of FIG. 2.

FIG. 4 is a view looking in an upward direction from below, of the details shown in FIG. 2, and FIG. 5 is a fragmentary view of a portion of FIG. 3 showing the device in the "shorted"-circuit position.

Figure 1:
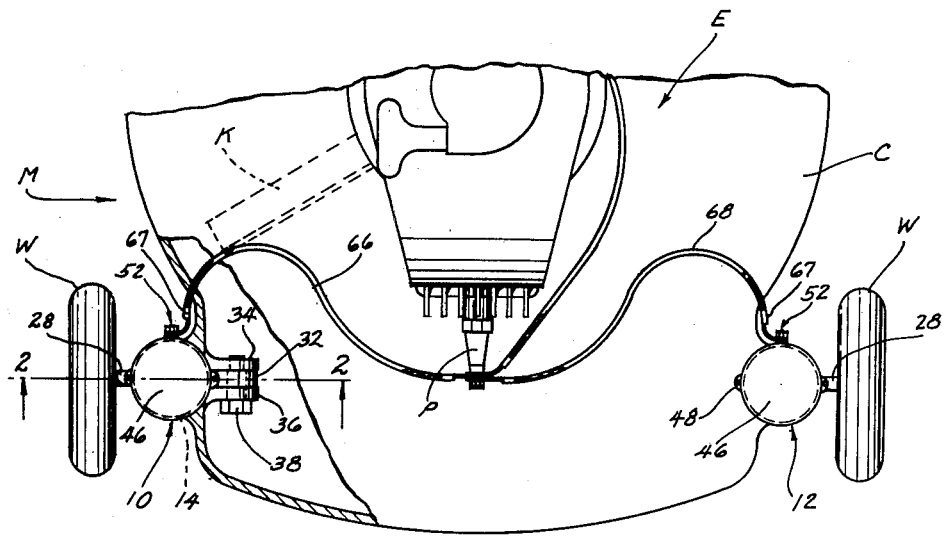
FIG. 1 is a fragmentary plan view of a rotary mower with some parts broken away to more clearly show the invention.

Referring to the drawings in detail: A mower M has a casing, enclosure, or housing C, an engine E provided with a spark plug P, a cutter knife K and a pair of front transport wheels W. A pair of rear wheels may also be provided, or a single rear caster wheel used. These are not shown as they are conventional. It is also within the purview of this invention to apply the invention to each of the rear wheels above mentioned, as well as to the front wheels.

The invention in this instance however, is associated with each of the wheels W so that tilting of the mower in either direction, permitting either one of wheels W to leave the ground or assume a position other than a normal one, will actuate the "shorting" device.

Figure 2:
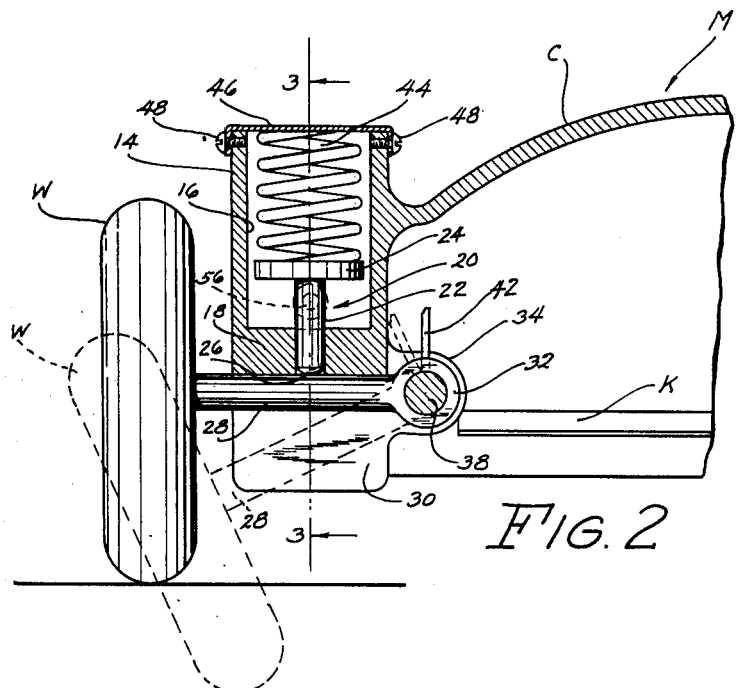
FIG. 2 is an enlarged, fragmentary, elevational sectional view taken at 2—2 of FIG. 1.

Each of the wheels W is supported from casing or housing C as shown in FIGS. 1 and 2, by a circuit-"shorting" assembly 10 and 12. These assemblies are identical as to details so only one need be described specifically.

Assembly 10 comprises a housing 14 which is integral with casing C. A vertical bore or cavity 16 is provided in housing 14 terminating in a bottom 18. A plunger 20 having a shank 22 and a cap portion 24 is fitted in bore 16. Shank 22 is slidably fitted in a guide aperture in the bottom 18 and terminates in a spherical contact end 26.

A wheel axle or displaceable means 28 supports wheel W and comprises the actuating means for the device. Axle 28 forms the journal for wheel W and moves freely in a vertical slot 30, and terminates in an eyelet 32 inwardly of housing 14 and in casing C. Casing C has integral lugs 34 and 36 freely embracing eyelet 32 between them. A shoulder stud 38 passes through lug 36 and eyelet 32 and is threaded into lug 34. Stud 38 has a shoulder 40 as shown in FIG. 4 to prevent clamping eyelet 32 so as to permit the axle 28 to move freely in slot 30, and about stud 38. A stop pin 42 is provided in eyelet 32 in order to limit the downward swinging of shaft 28 when the mower is raised from the ground. Normally, with the mower in the working position, shaft 28 will rest against bottom 18 and in slot 30, and contact end 26 of shank 22 will rest against the shaft as shown in FIGS. 2 and 3.

A compression spring 44 engages the face of cap 24 and is retained in bore 16 by a cover 46, secured by screws 48 to housing 14.

A grounded abutment pin or stop pin 50 is provided in the wall of housing 14 and extends into bore 16 thus forming a stop by which cap 24 is limited in its downward travel, and which pin 50 also serves as a "grounding" terminal.

Diametrically opposed to pin 50, but not necessarily so, is a terminal contact abutment pin assembly 52. An aperture is provided in housing 14 sufficiently-large to receive an insulating bushing 54 surrounding pin 52. Contact or terminal pin 52 has a head portion 56 of a diameter equal to that of pin 50 so that cap 24, when moving axially, will contact pin 50 and portion 56 simultaneously. The remainder of pin 52 is reduced in diameter and threaded at the outer end.

An insulating washer 58 is placed on pin 52 and against the inner wall 16 of housing 14. A similar insulating washer 60 is placed on pin 52 outwardly of housing 14, and a nut 69 completes the terminal assembly.

A conductor cable 66 of the type usually employed extends from a terminal 67 which has been assembled between a pair of washers 63 and 65, to a spark plug P. A similar cable 68 extends from the assembly 12, and also from any other wheel units that embrace the assembly of FIG. 2.

When the mower is tilted so that wheel W and its axle 28 assumes the position shown by dotted lines in FIG. 2, or in section as in FIG. 5, cap 24 will make simultaneous contact with pin portions 50 and 56. Thus current will flow across between the pins 50 and 56, "shorting" the engine ignition system and stop the engine. If this device is provided for each wheel W, the lifting of any one wheel will stop the engine. This arrangement is positive in that it relies upon a spring to actuate it.

The above being a complete description of an illustrative embodiment of the invention, what is claimed as new and desired to be secured by Letters Patent of the United States is:

1. In a mower comprising a housing supported for transport on a wheel having an axle, and a power means on said housing having an ignition system, in combination a means of interrupting the flow of current through said system comprising a pivot for said axle on said housing, said pivot extending transversely of the axis of said axle and spaced from said wheel, a plunger slidable in said housing and engaging said axle intermediate said wheel and said pivot, resilient means to urge said plunger into engagement with said axle, said plunger having an enlarged portion normal thereto, a shorting abutment adjacent said plunger and integral with said housing, a terminal abutment in said housing electrically insulated therefrom and positioned adjacent said plunger, an electrical conductor connected between said power means and said terminal abutment, said enlarged portion simultaneously contacting said shorting abutment and said terminal abutment upon displacement of said axle about said pivot.

2. In a mower comprising a housing supported for transport on a wheel having an axle, and a power means on said housing, in combination a means of interrupting flow of current to said power means comprising a pivot for said axle on said housing, said pivot extending transversely of the axis of said axle and spaced from said wheel, a plunger slidable in said housing, engaging said axle substantially normal thereto at a position spaced from said pivot, resilient means to urge said plunger into contact with said axle, said plunger having an enlarged portion normal thereto, a terminal abutment in said housing, electrically insulated therefrom and positioned adjacent said plunger, an electrical conductor connected between said power means and said abutment, said enlarged portion contacting said terminal abutment and interrupting flow of current to said power means upon displacement of said axle about said pivot.

References Cited in the file of this patent

UNITED STATES PATENTS

| | | |
|---|---|---|
| 1,454,957 | Cockrill | May 15, 1923 |
| 1,565,687 | Tomlinson | Dec. 15, 1925 |
| 2,107,912 | Spieth | Feb. 8, 1938 |
| 2,774,835 | Staley | Dec. 18, 1956 |